Dec. 20, 1955   H. E. ELLIOTT   2,727,759
VALVED COUPLERS FOR FLUID-CONDUCTING CONDUITS
Filed Oct. 27, 1951   3 Sheets-Sheet 1
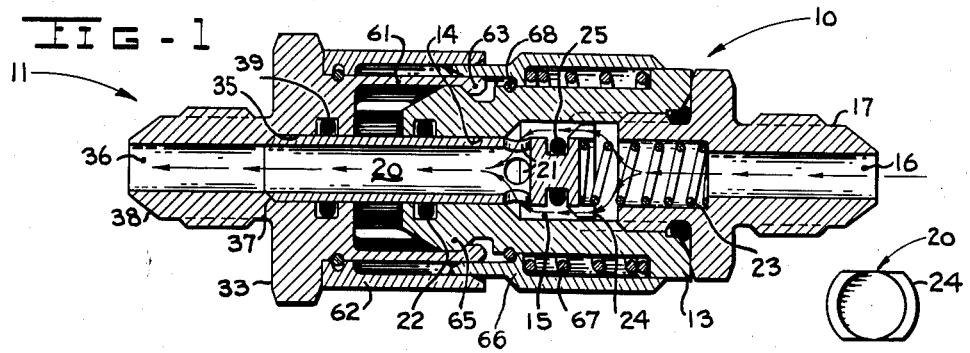
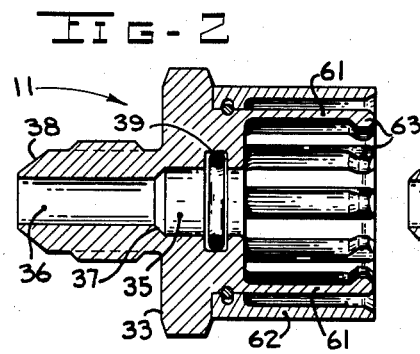
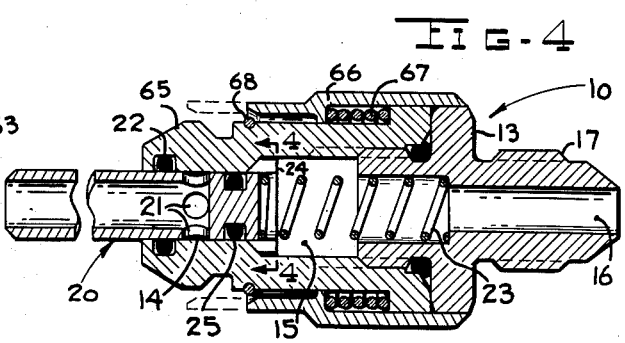
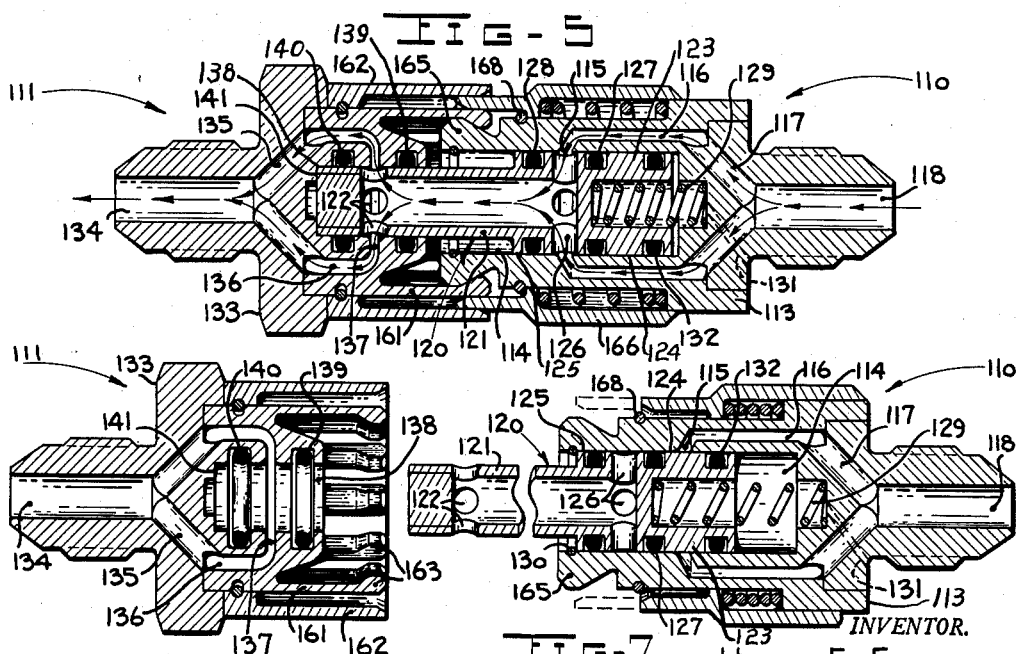
INVENTOR.
HARRY E. ELLIOTT.
BY Nicholas T. Volk Dec. 20, 1955 H. E. ELLIOTT 2,727,759
VALVED COUPLERS FOR FLUID-CONDUCTING CONDUITS
Filed Oct. 27, 1951 3 Sheets-Sheet 2
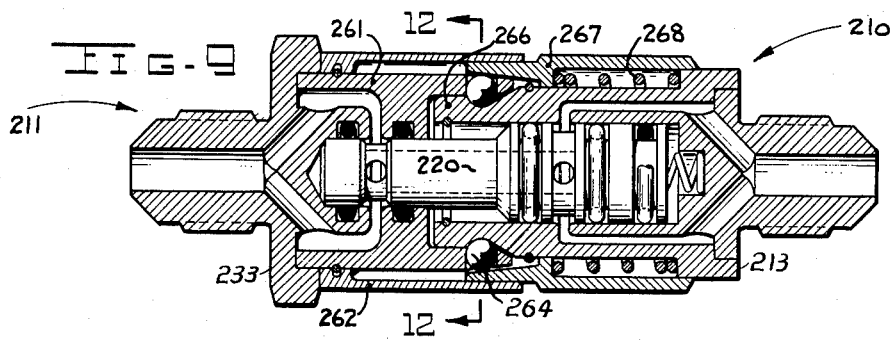
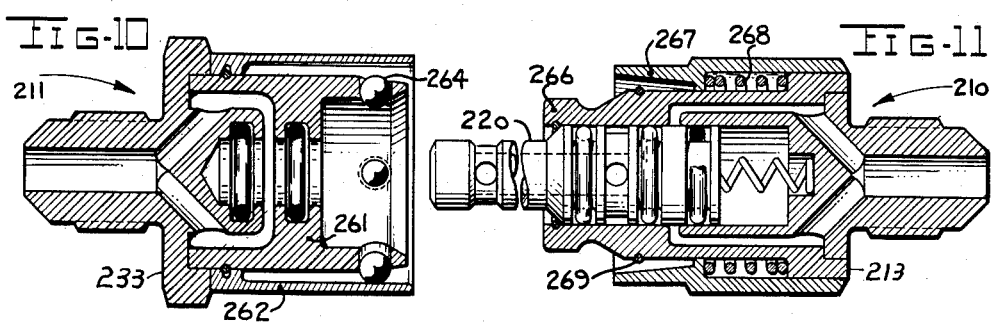
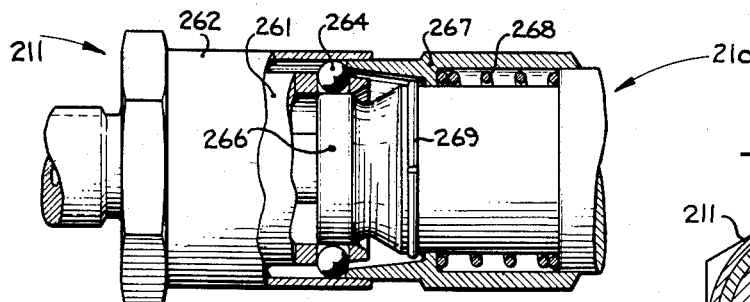
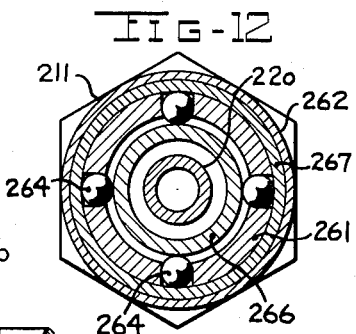
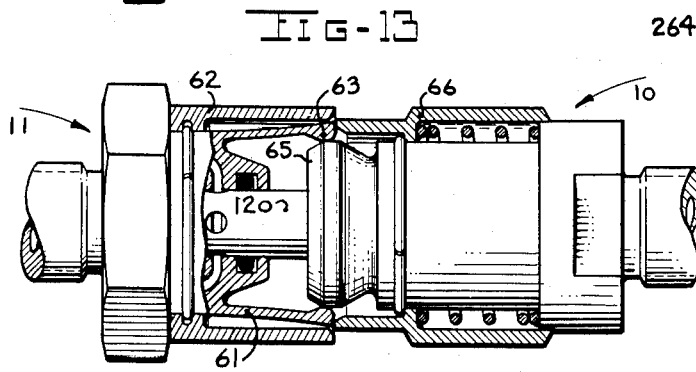
INVENTOR.
HARRY E. ELLIOTT.
BY Nicholas T Volse

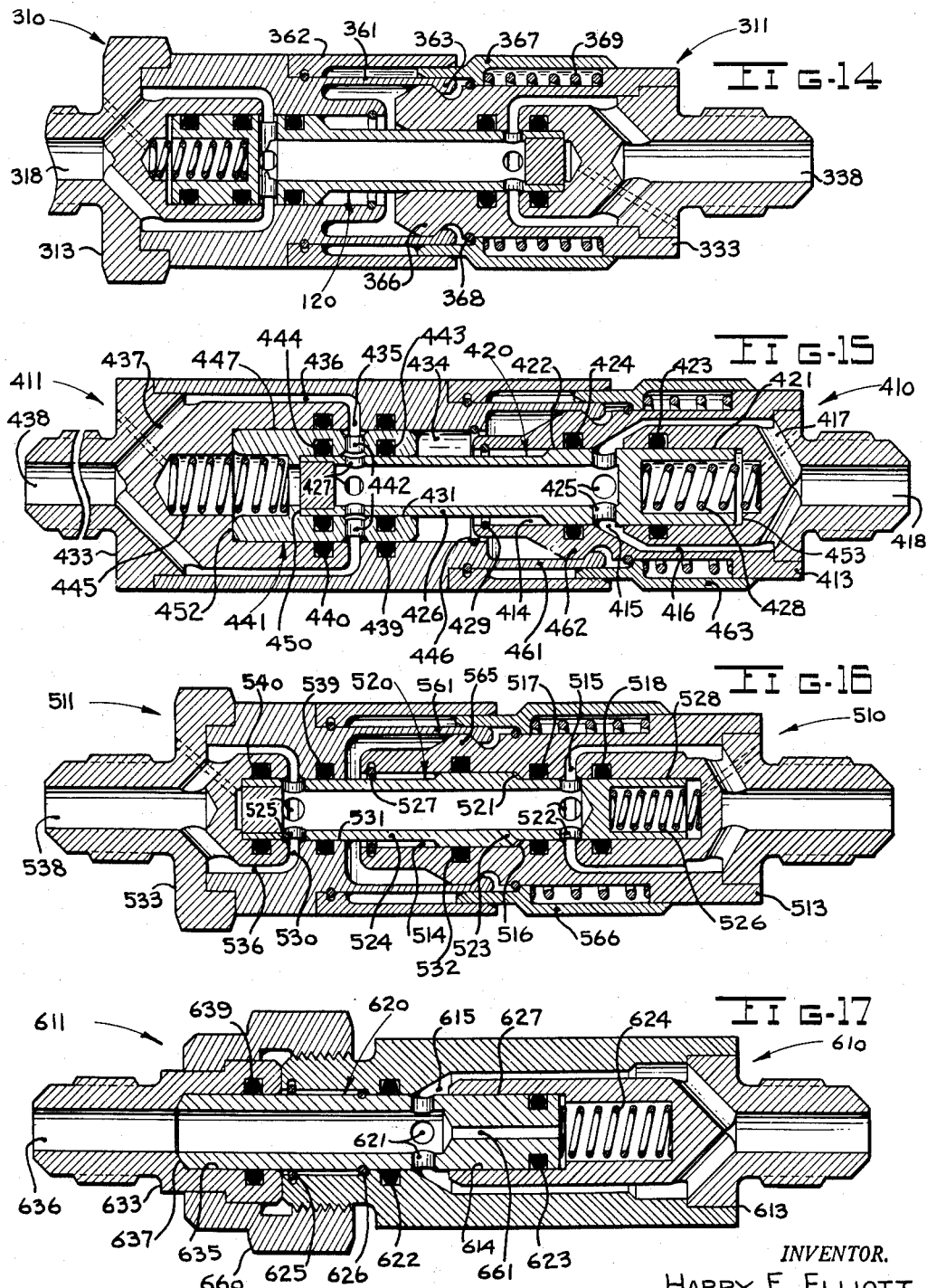
Dec. 20, 1955     H. E. ELLIOTT     2,727,759
VALVED COUPLERS FOR FLUID-CONDUCTING CONDUITS
Filed Oct. 27, 1951     3 Sheets-Sheet 3
INVENTOR.
HARRY E. ELLIOTT.
BY *Nicholas T Volk*

United States Patent Office 2,727,759
Patented Dec. 20, 1955

2,727,759

VALVED COUPLERS FOR FLUID-CONDUCTING CONDUITS

Harry E. Elliott, Venice, Calif., assignor to Hughes Tool Company, Houston, Tex., a corporation of Delaware Application October 27, 1951, Serial No. 253,545

1 Claim. (Cl. 284—18)

This invention relates to valved couplers for fluid-conducting conduits, and more particularly to couplers of this type which have separable members that can be quickly and easily coupled or uncoupled.

Conventional couplers of the above type are now used in pneumatic and hydraulic systems where it is necessary to make and break fluid connections with speed and without difficulty. The general construction of such couplers includes means to form a fluid-tight connection sealed against the loss of pressure; it also includes a valve in either or both members which is open while the members are coupled, but which closes to check the flow of fluid when the members are uncoupled; and it further includes means to mechanically connect the members in coupled relationship.

In the operation of conventional couplers, the valve or valves begin to open during the initial stage of making the fluid connection resulting in an actual loss of fluid before the fluid connection and the mechanical connection are complete. This is a decided disadvantage, particularly where the force of the escaping fluid could be dangerous, or where contamination of adjacent equipment could be harmful to personnel or material. Such couplers have a further disadvantage in that both the fluid connection and the mechanical connection must be made against the fluid pressure existing in the coupler members, and also in the tendency of this same fluid pressure to blow the coupler apart when the mechanical connection is released.

The current trend toward the use of extremely high pressures in hydraulic and pneumatic systems is rapidly increasing the difficulty of effecting coupler connections against these internal pressures and the danger to be anticipated from the escape of fluid or blowing apart of the members of the coupler. Yet, many installations which require provision against these disadvantages also necessitate the provision of structures which operate without attention from the operator to prevent loss of fluid from an uncoupled conduit. Further, a coupler is frequently required which admits of ready coupling or uncoupling even though installed in a confined space which permits the use of only one hand for these operations.

The disclosed couplers, among other advantages, meet these requirements by providing couplers which include balanced valves and balanced fluid connections which operate sequentially, so that the valve opens after the fluid connection is sealed during the coupling operation, and the valve closes before the fluid connection is broken during the uncoupling operation. Also disclosed are mechanical connecting means which may be connected or released by means of a simple manual push or pull, yet are positively locked against accidental disconnection.

It is, therefore, an object of this invention to provide a fluid conduit coupler in which the fluid connection, the valve opening and the mechanical connection are sequentially performed in the order named.

It is another object to provide such a coupler in which the mechanical disconnection, the valve closing and the fluid disconnection are sequentially performed in the order named.

It is also an object to provide a coupler in which the fluid connection is completed before the valve opens during the coupling operation, and in which the valve closes before the fluid connection is broken during the uncoupling operation.

It is a further object to provide a fluid conduit coupler of the above type which can be quickly and easily coupled and uncoupled by a simple straight-line movement which may be manually performed without the aid of tools.

It is another object to provide a fluid conduit coupler which eliminates the effect of fluid pressure upon the coupling and uncoupling operations.

Another object of the invention is to provide a fluid conduit coupler in which the fluid-conducting connection between the separable members operates in a manner to balance or equalize internal fluid pressure forces tending to separate the coupler.

It is also an object to provide such a coupler with balanced valving means in either or both of the separable members.

It is an additional object to provide couplers of this character in which the mechanical connection is accomplished by a positive-locking, quick-acting mechanical connecting means.

It is a further object to provide a fluid conduit coupler in which the coacting surfaces of the fluid connecting means are easily machined to the degree of smoothness necessary for long wearing qualities when operating under extremely high pressures.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a longitudinal sectional view of one embodiment of the coupler, which illustrates the separable male and female members in completely coupled relationship;

Fig. 2 is a sectional view illustrating the female member of the coupler shown in Fig. 1;

Fig. 3 is a sectional view illustrating the male member of the coupler shown in Fig. 1;

Fig. 4 is an end view of the valve taken along line 4—4 in Fig. 3;

Fig. 5 is a longitudinal sectional view illustrating a coupler embodying a balanced valve and a balanced fluid-conducting connection, with the male and female members in completely coupled relationship;

Fig. 6 is a sectional view of the female member of the coupler shown in Fig. 5;

Fig. 7 is a sectional view of the male member of the coupler shown in Fig. 5;

Fig. 8 is a partial sectional view of the coupler in Fig. 5, which illustrates the mechanical connection of the couplers in Figs. 1 and 5 in process of completion;

Fig. 9 is a longitudinal sectional view illustrating a coupler similar to the coupler in Fig. 5, with a modified form of mechanical connection means;

Fig. 10 is a sectional view of the female member of the coupler shown in Fig. 9;

Fig. 11 is a sectional view of the male member of the coupler shown in Fig. 9;

Fig. 12 is a sectional view taken along line 12—12 in Fig. 9;

Fig. 13 is a partial sectional view of the coupler in

Fig. 9, which illustrates the mechanical connection in process of completion;

Fig. 14 is a longitudinal sectional view of a coupler similar to the coupler illustrated in Fig. 5, except that the mechanical connecting means are shown reversed with respect to the separable members;

Fig. 15 is a longitudinal sectional view of a double-valved coupler having balanced valves, and a balanced fluid-conducting connection;

Fig. 16 is a longitudinal sectional view of a coupler provided with a balanced fluid connection, and a partially balanced valve;

Fig. 17 is a longitudinal sectional view of a coupler provided with a balanced valve in combination with an unbalanced fluid-conducting connection.

Referring to Fig. 1, the coupler illustrated is comprised of separable male and female members 10 and 11, respectively, which are shown in completely coupled fluid-conducting relationship. Male member 10, on the right hand side, includes a male body member 13 having an internal chamber 15 interconnecting a valve bore 14 and a bore 16 extending through a threaded nipple 17 fixed to the body member. A tubular member 20 having radial ports 21 opening into chamber 15 extends through bore 14 and projects from male body member 13 to provide a fluid-conducting passageway between the male and female members. When ports 21 are open to fluid pressure in chamber 15, the escape of fluid between the slidably engaged surfaces of bore 14 and member 20 is prevented by an O-ring 22 located in a groove in bore 14 near the outer end thereof.

It is to be noted that, except for the ports 21, the end of tubular member 20 extending into chamber 15 is closed, and is provided with a groove to hold O ring 25 which cooperates with valve bore 14 to stop any flow of fluid through ports 21 when these ports and the O ring 25 are inside the valve bore 14 as shown in Fig. 3. To limit the travel of member 20 in bore 14 under the influence of spring 23, a flange 24 of larger diameter than bore 14 is provided on the extreme end of member 20 for engagement with the end wall of chamber 15 (Fig. 3). To avoid constriction of the fluid passageway through the male member, opposite sides of flange 24 have been removed as illustrated in Fig. 4.

Female member 11, on the left hand side, Fig. 1, includes a female body member 33 having a bore 35 of such size as to slidably receive the end of member 20 projecting from male body member 13. A second bore 36, purposely made smaller in diameter than bore 35 so as to form a shoulder 37 at the junction of both bores, extends through a threaded nipple portion 38 of female body member 33. An O ring 39, held in a groove in the wall of bore 35 prevents the escape of fluid between the slidably engaged walls of member 20 and bore 35 when the male and female body members are coupled in fluid-conducting relationship.

A mechanical connecting means to securely hold male body member 13 and female body member 33 in fluid-conducting relationship comprises a plurality of fingers or latches 61 which extend axially from the female body member and terminate at their outer ends in lugs 63 for engagement with a shoulder 65 on male body member 13, Figs. 1, 2 and 3. A sleeve 62 removably mounted on body member 33 is positioned to surround latches 61 in a radially spaced relationship for protecting the latches from extraneous mechanical forces, and to also afford the coupler protection from dust particles. A latch-locking sleeve 66 slideably mounted on male member 13 telescopes within protecting sleeve 62 to engage and surround the ends of latches 61 for locking lugs 63 in position behind shoulder 65 as shown in Fig. 1. Locking sleeve 66 is constantly urged in this locking position by a compression spring 67, where further movement is prevented by snap ring 68. Lugs 63 and shoulder 65 have their engaging surfaces beveled as clearly shown in Figs. 2 and 3, so that a simple axial thrust will easily spread fingers 61 during the processes of engagement and disengagement.

The operation of completely connecting the coupler as it is illustrated in Fig. 1, is as follows: The end of tubular member 20, projecting from male body member 13, as shown in Fig. 3, is inserted into bore 35 of female body member 33 until it strikes shoulder 37, to thereby establish a fluid-conducting connection between the male and female body members. This connection is sealed against pressure loss by O ring 39. Since the end of tubular member 20 is stopped by shoulder 37, further movement of either body member toward the other causes member 20 to slide in bore 14 against the force of spring 23 until O ring 25 and ports 21 are inside chamber 15. During this further movement of either body member toward the other, lugs 63 slide over the outer beveled surface of shoulder 65, the ends of fingers 61 spread radially and engage the end of locking sleeve 66, as illustrated in Fig. 8, and fingers 61 force the locking sleeve back until lugs 63 slide behind shoulder 65 under the influence of the spring tension in the fingers. When lugs 63 are behind shoulder 65, spring 67 forces sleeve 66 over the ends of fingers 61 to positively lock the lugs behind the shoulder.

As shown in Fig. 3, ports 21 are normally sealed in bore 14 between O rings 25 and 22 to prevent passage of fluid under pressure from chamber 15 through the tubular portion of member 20. Thus, in effect, bore 14, ports 21, and O rings 22 and 25 operate as a valve, and relative movement between member 20 and male body member 13 will open or close this valve. Fluid pressure in chamber 15, when the valve is closed as it is in Fig. 3, assists spring 23 in holding ports 21 and O ring 25 inside bore 14 to hold the valve closed. However, when the valve is open, as shown in Fig. 1, fluid pressure in chamber 15 has no tendency to force tubular member 20 against shoulder 37 or move the member toward bore 16, because member 20 is constructed to include areas at right angles to its axis which areas are equal and opposite, and are exposed to the same fluid pressure, hence the open valve is balanced with respect to fluid pressure forces. Although the open valve is balanced, the coupler is unbalanced due to the inherent tendency of the fluid pressure to separate the male and female members, and to the force of spring 23 in maintaining the unsealed engagement between the end of member 20 and shoulder 37, which force also tends to separate the male and female members.

In connecting the coupler, a fluid-conducting connection is first established by the end of tubular member 20 in bore 35, the valve is opened by moving ports 21 into chamber 15, and the mechanical connection is made by lugs 63, shoulder 65, and sleeve 66.

With female member 11 restrained against movement, a single axial pull on locking sleeve 66 is all that is required to disconnect the coupling. This pull first compresses spring 67 and moves sleeve 66 clear of fingers 61; then it moves male body member 13 causing shoulder 65 to slide out of engagement with lugs 63 to release the mechanical connection and permit ports 21 and O ring 25 to slide into bore 14 to close the valve; then it finally withdraws the end of tubular member 20 from bore 35 to disconnect the fluid-conducting connection and separates the male and female members 10 and 11, respectively.

It is to be noted that the three events in the coupling operation occur in the following sequence: First, the fluid connection is established and sealed; second, the valve opens, and third, the mechanical connection is established. During the uncoupling operation, the events occur in reverse order; the mechanical connection is released, the valve closes, and finally the fluid connection is broken. Because of the order of this sequential operation, the valve is open at no time except when the fluid connection is completely established and sealed, with the result that chamber 15 is never open to the atmosphere, even instantaneously during the coupling or uncoupling steps.

It is further to be noted that the fluid connection and the valve require no attention from the operator, and the mechanical connection requires only a simple push or pull to effect connection or disconnection. Yet, the mechanical connection is positively locked to prevent accidental disengagement, resisting the effects of vibration, internal fluid pressure, or on external pull on the line.

Figs. 5, 6 and 7 illustrate a modified form of the coupler which can be connected without overcoming line pressure, which characteristic is realized through the use of a balanced valve and balanced fluid-connecting means. This coupler is also comprised of male and female members 110 and 111 respectively, the male member including a tubular valve member indicated generally by arrow 120.

Referring to Fig. 5, the coupler illustrated is in completely coupled fluid-conducting relationship, and the male member 110 includes a body 113 provided with a cylindrical bore 114 extending into the body from the coupling end thereof. Bore 114 is interconnected with the conduit end of the body by a passageway including an annular port 115 in the wall of the bore, an annular chamber 116, holes 117, and a bore 118 through a threaded nipple portion forming the conduit end of the body.

Slideably mounted for limited axial movement within bore 114 is a tubular valve member 120 provided with a tube 121 projecting outside the bore for effecting a fluid connection between the male and female members. The outer end of tube 121 is closed, and the wall of the tube adjacent to the closure is provided by a plurality of coupling ports 122. On the inner end of valve 120 is a head or piston 123 having inner and outer lands 124 and 125, respectively, which bear slideably against the walls of bore 114. Between the lands, the piston is provided with a plurality of valve ports 126 which open into the interior of tube 121. With the valve in open position, shown in Fig. 5, valve ports 126 communicate with annular port 115 thereby connecting tube 121 with the passageway through body 113, which connection is sealed against the loss of pressure by O rings 127 and 128 in recesses in the inner and outer lands 124 and 125, respectively. In the head of piston 123, and in the end wall of bore 114, cavities are provided for accommodating a compression spring 129 which constantly urges valve members 120 toward the closed position shown in Fig. 7, where further movement is prevented by a snap ring 130. A bleed hole 131 extends from the cavity in the end wall of bore 114 through an outer surface of body 113 to permit the escape of air entrapped. With the valve in closed position, Fig. 7, piston 123 of valve member 120, under force of spring 129, blocks annular port 115 by means of land 124 and O rings 127 and 132 which are recessed in the land for positions on the left and right, respectively, of port 115 as shown.

The female member 111 includes a body 133 provided with a passageway comprising a bore 134 through the threaded nipple on the conduit end of the body, holes 135, annular chamber 136, and annular port 137 in the wall of a cylindrical bore 138. Bore 138 extends into body 133 from the coupling end thereof for receiving tube 121 of the male member for establishing a fluid connection between male and female members 110 and 111. With tube 121 in bore 138 as shown in Fig. 5, coupling ports 122 communicate with annular port 137 and provide a connection between the passageways in body 113 and body 133, which connection is sealed by O rings 139 and 140 in recesses in the wall of bore 138, see Fig. 7.

The male and female members are provided with complementary parts of a mechanical connecting means, similar in construction and operation to that illustrated in Fig. 1, comprising fingers or latches 161 and a protecting sleeve 162 on body 133 of the female member, and a shoulder 165 and a latch-locking sleeve 166 on body 113 of the male member.

The coupler functions as follows: the coupling operation is initiated by sliding tube 121 of valve member 120 into bore 138 of body 133 until the outer or closed end of the tube engages a shoulder 141 at the bottom of the bore. This action aligns coupling ports 122 of tube 121 with annular port 137 of body 133, whereupon further movement of either male or female member 110 or 111 toward the other will cause piston 123 of valve member 120 to move in bore 114 of body 113 against the force of spring 129 until valve ports 126 in piston 123 are aligned with annular ports 115 in bore 114, thus providing a passageway through the assembled coupler, which includes bore 118, holes 117, annular chamber 116, annular port 115, valve ports 126, tube 121, coupling ports 122, annular port 137, annular chamber 136, holes 135 and bore 134. Simultaneously with the movement of piston 123 in bore 114, the mechanical connection is being established, that is lugs 163 slide into place behind shoulder 165, and locking sleeve 166 slides over latches 161 for positively locking the mechanical connection after the passageway through the assembled coupler has been established. The uncoupling operation is completely performed by a simple, straight-line pull on locking sleeve 166, which pull unlocks latches 161, slides lugs 163 from behind shoulder 165, and slides tube 121 out of bore 138 in the order stated. As lugs 163 slide from engagement with shoulder 165, and before tube 121 begins its movement out of bore 138, spring 129 forces piston 123 against snap ring 130 to block 115 in the manner previously described.

Attention is directed to the fact that the coupler disclosed in Fig. 5 is completely balanced with respect to fluid pressure. In other words, when male and female members 110 and 111 are connected as shown, fluid pressure within the passageways has no tendency to move tubular valve member 120 or to separate the male and female members, nor does pressure in the passageway of the male member have any effect on the force required to connect members 110 and 111 together. These characteristics result from the construction of valve member 120 in which both ends of tube portion 121 are closed and provide equal and opposite internal areas exposed to the same fluid pressure, this produces forces in the tube that are equal and opposite; moreover, O rings 140 and 132 prevent fluid pressure from entering the space between the ends of valve member 120 and the end walls of bores 138 and 114 in which the ends of the member operate; furthermore, fluid pressure entering and leaving tube 121 through the side walls thereof has no tendency to move valve member 120 in either direction, and when the valve is closed as shown in Fig. 7, pressure in the passageway of the male member has no tendency to move piston 123.

Although Fig. 8 has been referred to in describing the operation of the mechanical connecting means employed in the coupler illustrated in Fig. 1, it is equally applicable to explain the operation of similar connecting means shown in Figs. 5, 14, 15 and 16, all of which figures illustrate latches having lugs in engagement with beveled shoulders.

The coupler illustrated in Figs. 9, 10, 11, 12 and 13 is provided with a modified mechanical connecting means wherein spherical latches have been substituted for the spring finger latches 61 or 16 embodied in the couplers illustrated in Figs. 1 through 8, which modified structure would be suitable for any of the couplers described herein. The internal construction of the male and female members 210 and 211, respectively, is similar to the internal construction of the corresponding members 110 and 111 previously described in connection with Figs. 5, 6, and 7.

With reference to Fig. 9, the mechanical connecting means includes a latch sleeve 261 which forms a part of the female body member 233. Surrounding the latch sleeve is a retaining sleeve 262 removably attached to the body member. Latch sleeve 261 is pierced by a plurality of radial holes, each hole being provided with a spherical latch 264 and terminating in a restriction at its inner end, each spherical latch being trapped between the restriction and retaining sleeve 262 but free to move radially within the limits thus provided. When the coupler is connected (Fig. 9), latches 264 are forced behind a shoulder 266 on male body member 213 by a locking sleeve 267 slideably mounted on the body member so as to slide between the latch sleeve 261 and the retaining sleeve 262. The sphere engaging surface of sleeve 267 is tapered to provide a wedging action against spheres 264 forcing them into contact with shoulder 266 under the influence of a spring 268. A snap ring 269 retains the sleeve when the coupler is disconnected.

When the male and female members 210 and 211 are pushed together from the uncoupled positions shown in Figs. 10 and 11, shoulder 266 spreads spherical latches 264 as shown in Fig. 13. In this position latches 264 engage the end of locking sleeve 267, forcing it back sufficiently to allow the spherical latches to slide behind shoulder 266. Spring 268 then forces locking sleeve 267 to the left, which sleeve in turn forces the latches into engagement with shoulder 226 thereby positively locking the male and female body members together. A pull to the right on locking sleeve 267 will compress spring 268, move the locking sleeve clear of spherical latches 264, thus allowing them to disengage shoulder 266 and permitting separation of the male and female body members. From the above, it follows that the coupler may be connected by a single straight-line motion, forcing the male and female body members together; or the coupler may be disconnected by a single axial pull upon the locking sleeve, in a manner identical to the movements used for connecting and disconnecting the couplers of Figs. 1 and 5. This alternative to the spring latch construction for the mechanical connecting means combined with the internal structural features of the coupler shown in Fig. 5, provides a completely balanced coupler for interconnecting fluid-conducting conduits, and the previous description of the passageways through male and female members 110 and 111, and the manner in which tubular valve member 120 operates to connect those passageways applied equally well to the corresponding members 210, 211 and 220.

Fig. 14 illustrates a modification of the coupler in Fig. 5 and shows the components of the mechanical connecting means in reversed location with respect to the male and female members. In other words, the fingers or latches are on male member 310 shown on the left-hand side in this figure, while the shoulder and latch-locking sleeve are on female member 311, shown on the right-hand side of the figure. The internal construction of the male and female members is similar to the internal construction of the corresponding members illustrated in Figs. 5 through 8, and include similar passageways which are similarly interconnected by the same tubular valve member 120 previously described.

The mechanical coupling means provided is similar to the coupling means illustrated in Fig. 1, but the spring latches 361 are mounted on male body member 313 as is the protecting sleeve 362. Lugs 363 on the outer ends of the latches engage, when the coupler is connected, a shoulder 366 on female body member 333, and are locked by a latch-locking sleeve 367 slideably mounted on the female body member. The locking sleeve is normally held in locking position against a snap ring 368 by a spring 369. During the coupling operation, the ends of fingers 361 override the shoulder, pushing back locking sleeve 367 to allow engagement of lugs 363 and shoulder 366 (see Fig. 8). The mechanical connection is released by an external pull on locking sleeve 367 against the force of spring 369. Operation of this mechanical connecting means is identical to the operation of the mechanical connecting means in Fig. 1 previously described.

The embodiment illustrated in Fig. 14 is appropriate for use in a system made up of a header or other fixed pressure source, and portable appliances requiring fluid pressure, wherein it is necessary to prevent loss of fluid from the header upon disconnection of an appliance. In such applications it has a special advantage in that the exposed, highly polished valve tube is located in the member which is mounted in a relatively fixed position where it is less likely to become damaged from careless handling.

Fig. 15 illustrates a double-valved coupler, completely assembled, in which the characteristics of balance with respect to internal fluid pressure and the sequential connecting operations (previously explained) have been retained. A valve in female member 411 is provided by a sliding sleeve, indicated generally as 441, which is functionally analogous to the sliding tubular valve member 120, previously described, because it operates as a valve and as a part of the means for interconnecting the passageway through the male and female members 410 and 441, however, it differs structurally because the connecting means is an internal cylindrical surface instead of an external cylindrical surface.

The male member 410 includes a body 413 having a bore 414 extending into the body from the coupling end thereof and interconnected with the conduit end by a passageway including an annular port 415 in wall of the bore 414, an annular chamber 416, holes 417, and a bore 418 through the threaded nipple on the end of the body. Slideably mounted within bore 414 is a tubular member 420 having inner and outer lands 421 and 422 which bear against the walls of the bore where they are sealed against fluid pressure loss by O rings 423 and 424. Between the lands is a plurality of valve ports 425 which, with the valve in open position as shown, interconnect the annular port 415 with the interior of a tubular extension 426 of member 420 projecting outwardly beyond the bore 414 for providing a passageway between the male and female members. The outer end of tube 426 is plugged and the walls adjacent to the plug are pierced by a plurality of coupling ports 427. A compression spring 428 constantly urges tubular member 420 toward its closed position where a snap ring 429 prevents further outward movement and land 421 blocks annular port 415.

The female member 411 includes a body 433 having a cylindrical bore 434 extending into the body from the coupling end thereof and interconnected with the conduit end by a passageway including an annular port 435 in wall of the bore 434, an annular chamber 436, holes 437, and a bore 438 through the threaded nipple on the end of the body. Slideably mounted within bore 434 and sealed against fluid pressure loss by O rings 439 and 440 is an interconnecting sleeve indicated generally by numeral 441 having a bore 431 for slideable engagement with the projecting tube 426 of tubular member 20. The walls of sleeve 441 are pierced by a plurality of radial ports 442, so that, when the male and female members are assembled in fluid-conducting relationship, as shown, ports 442 communicate with annular port 435 in the wall of bore 434, and with ports 427 in tube 426 projecting from male member 410. The passageway between radial ports 442 and ports 427 is sealed against pressure loss by O rings 443 and 444 in the wall of bore 431 of sleeve 441. A spring 445 constantly urges interconnecting sleeve 441 toward a position where a snap ring 46 prevents further outward movement, and where a land 447 on the sleeve blocks the annular port 435 with the aid of O rings 439 and 440 to stop any flow of fluid through the female member when the coupler is uncoupled.

Male and female body members 413 and 433 are provided with a mechanical connecting means including finger-latches 461 on the female member, and a shoulder 462 and a locking sleeve 463 on the male member, similar in structure and operation to that illustrated in Fig. 1.

The coupling operation is initiated by sliding tube 426 of tubular member 420 into bore 431 of interconnecting sleeve 441 until the outer or closed end of the tube engages a shoulder 450 in bore 431 of the interconnecting sleeve, thus aligning coupling ports 427 of tube 426 with radial ports 442 of the sleeve. It is to be noted that sleeve 441, and the tubular member 420 perform similar functions, that is, they operate jointly to establish a fluid-conducting connection between the passageways of body members 413 and 433, each operates as a valve to block the passageway of its respective body member. With the end of tube 426 in contact with shoulder 450, further relative movement of the male and female members 410 and 411, respectively, toward each other will compress spring 428 in male body member 413 and spring 445 in female body member 433, and align radial ports 442 of sleeve 441 with annular port 435 in the wall of bore 434 of the female body member and valve ports 425 of tubular member 420 with annular port 415 in the wall of bore 414 of the male body member, thereby connecting the passageways in the male and female body members in fluid-conducting relationship through tube 426. The interconnecting members sleeve 441 and tubular member 420 are positioned longitudinally by a shoulder 452 at the bottom of bore 434 in the female body member and a shoulder 453 at the bottom of bore 414 in the male body member.

After the fluid-conducting connection is complete, and while the valves are being opened, fingers 461, shoulder 462, and locking sleeve 463 cooperate to establish the mechanical connection which is completed after the valves are opened in the same manner as described for the coupler in Fig. 1.

When male and female members 410 and 411 are connected as shown, the assembled elements cooperate to form a passageway through the coupler, which passageway includes bore 418, holes 417, annular chamber 416, annular port 415, valve ports 425, tubular extension 426, coupling ports 427, radial ports 442, annular port 435, annular chamber 436, holes 437, and bore 438. Because of the construction of tubular member 420 and sleeve 441, fluid pressure has no tendency to move either element when the male and female members are coupled or when they are uncoupled; furthermore, when the members are coupled, the fluid pressure produces no forces tending to separate the coupler. These characteristics have been previously explained in connection with the description of the coupler disclosed in Fig. 5. Thus, like the coupler in Fig. 5, the coupler illustrated in Fig. 15 is completely balanced with respect to fluid pressure, and retains the same positive mechanical locking feature. In addition, the coupler in Fig. 15, includes a balanced valve in female member 441, which valve is not provided in female member 111 of the coupler in Fig. 5.

Fig. 16 illustrates another coupler in which fluid pressure in the passageway through the assembled coupler produces forces tending to separate the male and female members of the coupler. Male body member 513 includes a stepped cylindrical bore 514 having a shoulder 516 between the steps. The inner and smaller diameter portion of the bore is interconnected with the conduit end of body 513 by a passageway including a port 515 in the wall of the bore, which passageway and port are similar in every respect to the passageway and port 115 in body member 113, Fig. 5. Bore 514 is provided with O rings 517 and 518 positioned one on each side of port 515 as shown. An interconnecting tube 520, provided with a shoulder 521 between stepped cylindrical surfaces is mounted within bore 514 so that correspondingly stepped surfaces of both tubular member 520 and bore 514 are slideably engaged.

For interconnecting annular port 515 with the interior of tubular member 520, a plurality of valve ports 522 are provided through the wall of the tubular member, which valve ports are aligned with the annular port when the coupler is assembled as shown. A port 523 provides communication between the interior of tubular member 520 and the annular space in bore 514 between shoulder 521 on member 520 and shoulder 516 in bore 514. An extension 524 of tubular member 520 projects outside bore 514 and beyond the end of body member 513. The end of extension 524 is closed except for a plurality of coupling ports 525 through its wall. A spring 526 constantly urges tubular member 520 toward a position where a snap ring 527 in bore 514 prevents further outward travel, and where a land 528 on the tubular member blocks annular port 515 and cooperates with O rings 517 and 518 to stop any flow of fluid through the male body member.

A fluid passageway through female body member 533, similar in every respect to the passageway through female body member 133, Fig. 5, includes an annular port 530 in the wall of a bore 531 extending into the body member from the coupling end thereof. Bore 531 is adapted to receive the end of tube extension 524 so that coupling ports 525 communicate with annular port 530 to connect the passageway in the female body member with the interior of tubular member 520, which connection is sealed against pressure loss by O rings 539 and 540.

The male and female body members are provided with mechanical connecting means comprising spring finger latches 561 on the female member and shoulder 565 and latch-locking sleeve 566 on the male member, similar to that illustrated in Figs. 1 through 8.

It is to be noted that pressure in bore 514 in the space between O rings 517 and 532, and in the space between shoulders 516 and 521 of male body member 513 and tubular member 520, respectively, which pressure will impart an axial thrust against shoulder 521 tending to move member 520 out of bore 514, hence the thrust maintains the end of extension 254 against a shoulder in the bottom of bore 531 in the female member. In applications subjected to extreme vibration, this feature will reduce materially the wear and leakage resulting from relative movement between the parts of an assembled coupler. This unbalanced force also tends to force the male and female members apart sufficiently to take up any backlash in the mechanical coupling means, thereby reducing wear on the latches due to vibration. Yet, this coupler retains most of the characteristics of the couplers previously described, among which are one-motion coupling and uncoupling procedures, the absence of pressure loss during these operations, and the reduction of the force required of an operator to connect the coupler while the conduit is subject to high internal pressure.

Fig. 17 illustrates male and female members 610 and 611 which cooperate to provide a coupler similar to the coupler disclosed in Fig. 1, except for the mechanical connecting means and the valve arrangement, of which the latter is similar to the valve arrangement shown in Figs. 5 and 7. Referring to the figure, a male body member 613 includes a bore 614 extending into the body from the coupling end thereof, and an annular port 615 in the wall of the bore, which port is connected with the conduit end of the body by a passageway similar in every respect to the passageway in male body member 113, Fig. 5. A tubular member 620 is slideably mounted within bore 614 so that one end of the tube projects outside body member 613 for cooperation with female member 611. Intermediate the ends of sleeve 620 is a plurality of valve ports 622 which, when the coupler is assembled as shown, are aligned with port 615 in the wall of bore 614 for connecting the passageway in the male body member with the interior of the tubular member. O ring 622 in bore 614 and O ring 623 in member 620 seal this connection and prevent pressure loss. At the bottom of bore 614 is a cavity for a compression spring 624 which constantly urges member 620 toward a position where engagement between snap ring 625 in body 613 and snap ring 626 on member 620, prevents further outward movement of the member, and where a land 627 on member 620 blocks annular port 615 of the male body member and cooperates with O rings 622 and 623 to prevent any flow of fluid pressure through the passageway in male body member 613.

Female member 611 includes a body member 633 which is provided with a bore 635 adapted to receive the projecting portion of member 620. A second bore 636 intersects the bottom of bore 635 to form a shoulder 637, and to complete a passageway through body 633.

For mechanically connecting the male and female members of the coupler, male body member 613 is threaded for engagement with a ring nut 660 mounted on female body member 633.

The coupling operation is started by sliding tubular member 620 into bore 635 of body member 633 until the end of the tube bears against shoulder 637, this establishes a connection between member 620 and bore 636, which connection is sealed against pressure loss by an O ring 639. Further movement of either body member toward the other causes member 620 to move in bore 614 against the force of spring 624 to a final position where ports 621 are aligned with annular port 615 as shown. Ring nut 660 is turned into engagement with the mating threads on the male body member to complete the mechanical connection.

When the coupler is assembled as illustrated, an opening 661 in the end of tubular member 620, which end slides within bore 614, prevents fluid pressure within the tube and bore 636 from exerting a thrust tending to move the tubular member. In other words opening 661 permits tubular member 620 to be balanced with respect to fluid pressure within the coupler.

With respect to each of the couplers herein described, it is to be noted that a tubular member operates to completely establish a fluid-conducting connection and, after the connection is thus established, said tubular member operates as valve for opening the passageway through the coupler; and that the fluid-conducting connection is established independently of either the operation of the valve or the establishment of the mechanical connection between the separable male and female members. After establishment of the fluid-conducting connection, an operator may effect opening of the valve by continuing the coupling procedure. When fluid-conducting relationship between the members has been completely established, the mechanical connection becomes operative to maintain this relationship. Conversely, an operator may release the mechanical connection independently of the operation of either the valve or the fluid-conducting connection between the members. However, separation of the members will be automatically accompanied by, first, closing of the valve, and finally severance of the fluid-conducting connection.

In addition to the above features each of the embodiments disclosed also include pressure balancing characteristics and simple, straight-line coupling and uncoupling procedures, thus providing couplers which may be operated with a minimum of skill and effort, combined with an absolute minimum of fluid loss during these operations.

What is claimed as new is:

A coupler for coupling and uncoupling fluid-pressure-conducting conduits, in which the coupling and uncoupling operations are unaffected by fluid pressure in the conduits, said coupler comprising: first and second separably coupled body members having, respectively, first and second oppositely facing axially aligned bores and first and second fluid-conducting passageways with first and second ports communicating with said bores intermediate the ends thereof; first means disconnectably connecting the first and second passageways in fluid-conducting relationship, said first means including a valve element having a longitudinal axis, first and second cylindrical end portions slidably associated with the first and second bores, respectively, and a third fluid-conducting axial passageway with radial openings in the cylindrical surfaces of said end portions communicating with the first and second ports, said third passageway having equal and opposite internal surface areas for balancing axial forces resulting from fluid pressures within this passageway, said first end portion being mounted for limited sliding movement thereof outwardly of the first bore from an inner position wherein the first end radial opening is aligned with the first port when the passageways are in connected relationship to an outer position wherein said first port is blocked by said first end portion when the passageways are in disconnected relationship, and said second end portion being received for sliding removal from the second bore to permit separation of the body members and abutting the inner end of the second bore in response to the coupling operation of the body members for effecting alignment of the second end radial opening with the second port and comprising a second means to effect movement of the first end portion from the outer to the inner positions in the first bore; a resilient element between the first body member and the valve element for effecting movement of the first end portion outwardly of the first bore in response to the uncoupling operation of the body members; third means in said first bore adjacent the outer end thereof limiting the outward movement of the first end portion and for establishing the outer position wherein said first end portion blocks the first port; and a mechanical means associated with the first and second body members releasably holding said body members in coupled fluid-conducting relationship, said mechanical means including an independently movable locking element adapted to prevent accidental uncoupling of the body members.

References Cited in the file of this patent

UNITED STATES PATENTS

| | | |
|---|---|---|
| 879,880 | Landan | Feb. 25, 1908 |
| 1,973,610 | Connors | Sept. 11, 1934 |
| 2,168,915 | Ostendorf | Aug. 8, 1939 |
| 2,441,363 | Krueger | May 11, 1948 |
| 2,453,741 | Bopp | Nov. 16, 1948 |
| 2,509,444 | Mitchell | May 30, 1950 |
| 2,545,796 | Scheiwer | Mar. 20, 1951 |
| 2,553,680 | Scheiwer | May 22, 1951 |
| 2,612,389 | MacGlashan | Sept. 30, 1952 |